United States Patent [19]

Brunberg et al.

[11] 4,186,794
[45] Feb. 5, 1980

[54] METHOD AND SYSTEM FOR STORING AND EXTRACTING LOW-TEMPERATURE HEAT ENERGY

[76] Inventors: Ernst-Åke Brunberg, 34, Frejavagen, Djursholm, Sweden, S-182 64; Ray Olsson, 27, Boforsgatan, Farsta, Sweden, S-123 44

[21] Appl. No.: 865,214

[22] Filed: Dec. 28, 1977

[30] Foreign Application Priority Data

Dec. 29, 1976 [SE] Sweden ............................ 7614653

[51] Int. Cl.$^2$ .................. F25B 15/00; F25B 17/02
[52] U.S. Cl. ........................... 165/2; 62/101; 62/478
[58] Field of Search ............ 62/2, 101, 478; 165/2

[56] References Cited

U.S. PATENT DOCUMENTS

| | | | |
|---|---|---|---|
| 3,642,059 | 2/1972 | Greiner | 165/2 |
| 3,788,385 | 1/1974 | Delahunty | 165/2 |
| 4,044,819 | 8/1977 | Cottingham | 62/2 |
| 4,048,810 | 9/1977 | Zeilon | 62/101 |
| 4,061,185 | 12/1977 | Faiczak | 165/2 |
| 4,062,489 | 12/1977 | Henderson | 62/2 |
| 4,094,355 | 6/1978 | Blytas | 62/101 |

Primary Examiner—Lloyd L. King
Attorney, Agent, or Firm—Hubbell, Cohen, Stiefel & Gross

[57] ABSTRACT

Heat energy is stored chemically in and extracted from an energy accumulator containing a substance which contains less liquid in the charged, high-energy condition of the accumulator than it does in the discharged low-energy condition of the accumulator, which is associated with vapor condensing and generating means which is maintained at a low temperature as compared with the accumulator in which a liquid container is comprised. Vapor is driven off from the accumulator substance and transferred to the vapor condensing and generating means when energy is stored in the accumulator, and is returned to the accumulator when heat energy is extracted therefrom. The system comprising the accumulator and said vapor condensing and generating means is maintained substantially free from other gases than said vapor.

21 Claims, 8 Drawing Figures

METHOD AND SYSTEM FOR STORING AND EXTRACTING LOW-TEMPERATURE HEAT ENERGY

BACKGROUND OF THE INVENTION

1. Field of the Invention

The invention relates to a method of storing energy in an energy accumulator and of extracting energy out of it, and to a system for carrying out the method.

2. Description of the Prior Art

Due to the ever increasing utilization of energy and to the apparently forthcoming exhaustion of the high-grade energy sources available nowadays much work has been spent to reduce the immense waste of energy which is presently taking place and to devise new and improved methods and systems for the storage of energy.

A plurality of such schemes are discussed in a paper "Some Physical Chemical Aspects of Heat Storage" written by Martin Goldstein and appearing in "Proceedings of the United Nations Conference on New Sources of Energy", "Solar Energy, Wind Power and Geothermal Energy", Rome 21-31 August 1961, Volume 5, Solar Energy: II (United Nations, New York, 1964). In the section "Heats of Vaporization" (pages 413-416) Goldstein describes a system comprising two chambers, viz. a "hot chamber" and a "cool chamber", which contain a vaporizing liquid or substance having a lower vapor pressure at a given temperature in the "hot chamber" than in the "cool chamber". This substance may be present either as one component of a solution, the second component being relatively non-volatile, or else in a chemically bound form, such as hydrate or ammoniate. The cool chamber may condense the liquid directly, absorb it as a hydrate of lower stability, or absorb it in a solution from which it has a higher vapor pressure at a given temperature. The supply of heat to the storage chamber distills substance to the cool chamber where it condenses, losing heat to the environment. When as a result of a temperature drop on the hot side, the vapor pressure falls below the vapor pressure on the cool side, the substance distills back into the hot chamber, supplying heat as it condenses there. In a sense, the heat is stored in the atmosphere or environment, and removed therefrom when needed, through the medium of the volatile liquid.

As far as we know, Goldstein's scheme has not yet matured into any systems which are usable in practice. This is apparently due to the fact that Goldstein has found systems for carrying out his method to be very complex in construction and sensitive to changes in the environmental temperature. Furthermore, Goldstein has found it undesirable from an engineering point of view to maintain the system at pressures much lower than atmospheric, which is of great importance when the vaporizing and condensing substance or liquid is water. Last but not least Goldstein has not been able to find a sufficiently perfect substance.

A system based upon substantially the same principles and relating not to the storage of energy but to heating and cooling is disclosed in the U.S. Pat. No. 3,642,059 to Greiner.

The principal object of the present invention is to provide a useful, improved method in the storage of energy and a simple, inexpensive and reliable system for carrying out said method.

SUMMARY OF THE INVENTION

Heat energy is stored in and extracted from an energy accumulator comprising a substance which contains less liquid in the charged, high-energy condition of the accumulator than it does in the discharged, low-energy condition of the accumulator. At the storage of energy vapor is driven off from the substance and transferred to vapor condensation and generation means which is kept at a low temperature as compared with the accumulator and in which a liquid container is comprised. The condensed vapor is returned to the accumulator and absorbed by the substance therein, at the extraction of heat energy from the accumulator. According to the invention the system comprising the accumulator and said low temperature means is maintained substantially free from other gases than said vapor, so that the pressure in said system is constituted substantially by the pressure of said vapor.

A system for the storage and extraction of heat energy includes at least one energy accumulator comprising a substance, which contains a bound liquid in the low-energy or discharged condition of the accumulator and which substantially lacks bound liquid in the high-energy or charged condition of the accumulator; means for the charging of the accumulator by vaporization of liquid from the substance of the accumulator due to supply of heat from an energy source to the accumulator substance; a vapor condensating and generating means, which has a low temperature in relation to the energy accumulator and has a liquid container for collecting condensed vapor from the accumulator substance and means for the supply of vapor from the liquid container to the accumulator substance for discharging the accumulator; pressure reducing means for maintaining the partial pressure of other gases than said vapor at a lower level than the partial pressure of said vapor in the system comprising the energy accumulator and said low temperature means; and means for utilizing the energy freed at the discharge of the accumulator.

DESCRIPTION OF THE PREFERRED EMBODIMENTS

A method of storing and extracting heat energy, which is based upon the above principles, is described in the following, reference being made to FIG. 1. The processes there take place without the presence in the system of air or other gases than water vapor (other than in negligible amounts) at the supply of vapor to, and the discharge of vapor from, the accumulator, respectively.

Figure 1:
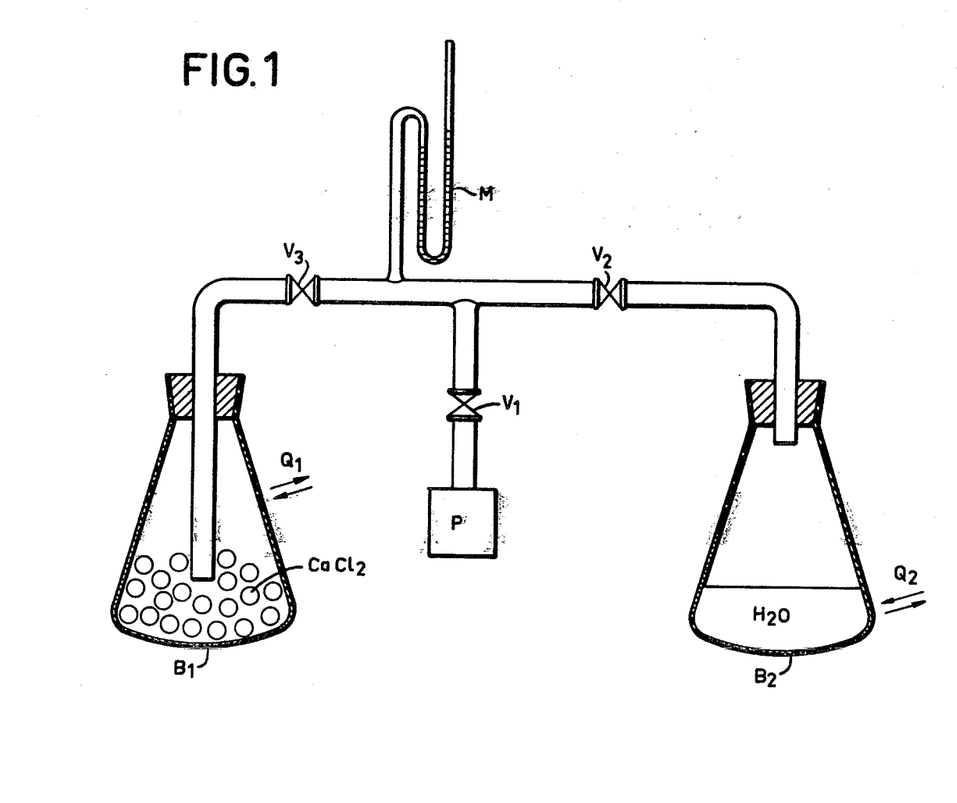
FIG. 1 is a simplified basic sketch of a device for accumulating and extracting energy according to the so-called "low-pressure method".

In FIG. 1, $B_1$ and $B_2$ are two containers, which are gas and pressure tight and are connected to each other and to a vacuum pump P capable of delivering a lowest pressure of about 0.5 torr. $V_1$, $V_2$ and $V_3$ are valves and M is a mercury manometer. As an illustrative example the container $B_1$ is presumed to be filled with $CaCl_2$, and the container $B_2$ with $H_2O$. $B_1$ as well as $B_2$ are made of metal in order to facilitate the supply and the removal of heat energy (in FIG. 1 designated by $Q_1$ and $Q_2$).

At first, substantially all air is removed from the system by operation of the pump P with open valves $V_1$ and $V_2$. The pressure finally indicated on the manometer M is substantially the pressure of the water vapor at the temperature prevailing in the entire system (for example 18 torr at $+20°$ C.). Thereafter the valve $V_2$ is closed and the valve $V_3$ is opened. After some pumping, the manometer M shows a pressure lower than 1 torr. The valve $V_1$ then is closed, and the process of energy extraction from $B_1$ starts when $V_3$ and $V_2$ are both open.

Figure 2:
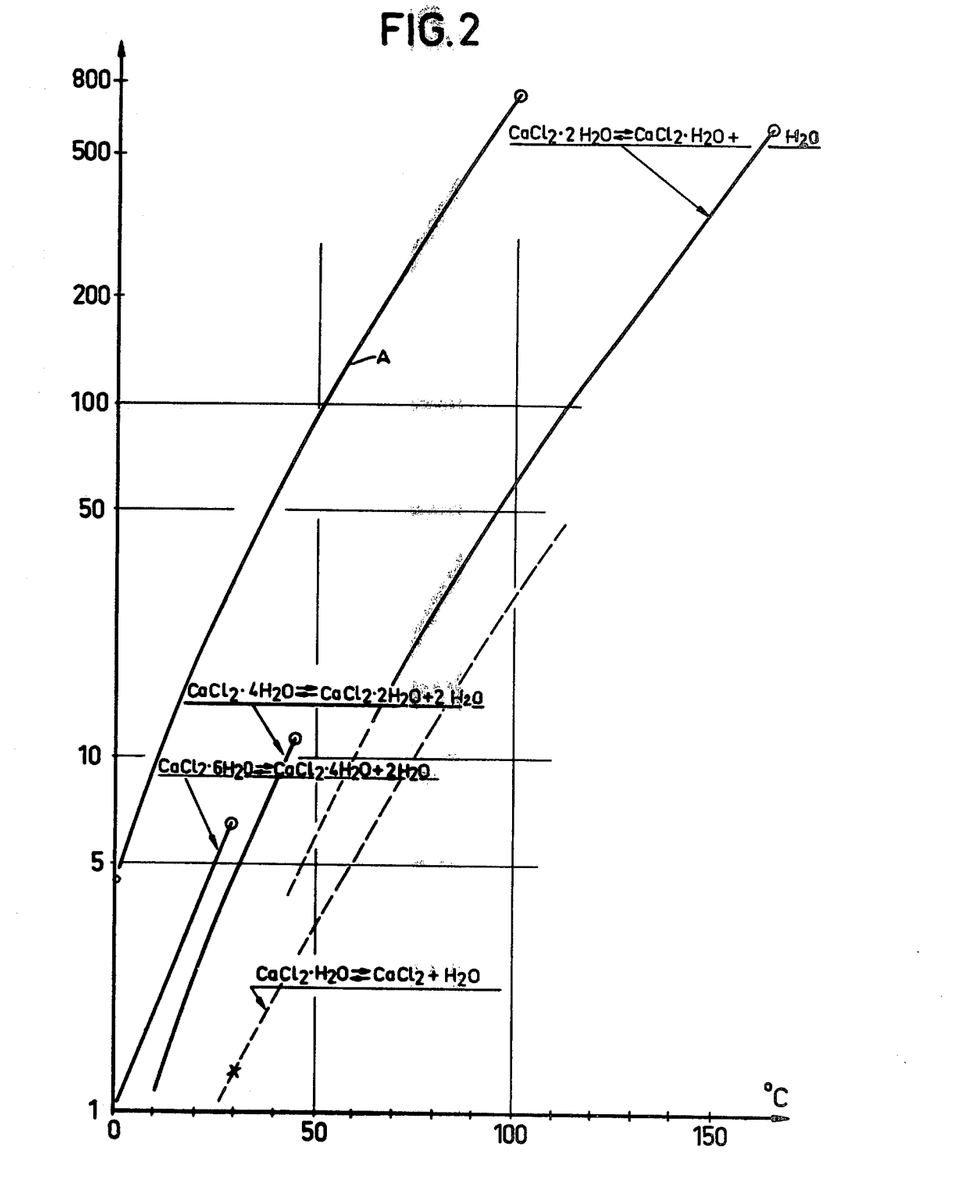
FIG. 2 illustrates curves of equilibrium for $CaCl_2$ which is suitable as an illustrative example at the transition between different phases of water of crystallisation, where the water vapor pressure is expressed as a function of the temperature.

The energy extraction process is illustrated in FIG. 2, which shows the water vapor pressure above a water surface (curve A) and curves of equilibrium for $CaCl_2$ and its hydrates which are chosen as an example of calculation, since they are well suited for illustrating the principles of the invention, at the transitions between different phases of water of crystallisation. In the area to the left of the curve in question water of crystallisation is taken up, and in the area to the right of the curve in question water of crystallisation is discharged. The diagram in FIG. 2 shows that the water vapor pressure above $CaCl_2$ and all of its hydrates ($H_2O$, $2H_2O$, $4H_2O$ and $6H_2O$) at all temperatures is lower than the water vapor pressure above a water surface. When the containers $B_1$ and $B_2$ are connected to each other, the pressure difference between them causes water vapor to flow from the container $B_2$ to the container $B_1$ where it is taken up as water of crystallisation by $CaCl_2$, and successively hydrates thereof are formed, whereby heat is released and the temperature in the container $B_1$ increases. When, for example, the temperature in the container $B_2$ is $t_2 = 20°$ C. and this temperature is maintained constant by heat ($Q_2$) supplied to the container $B_2$ from outside (in order to compensate for steam formation energy taken up by the water vapor in $B_2$) the pressure is $P_2 = 18$ torr in the container $B_2$. When further, the starting temperature in the container $B_1$ is $t_1 = 30°$ C. or lower, the pressure difference between the containers $B_2$ and $B_1$ at the start of the process is about 17 torr. With proceeding take-up of water in the container $B_1$, transitions to different hydrates take place, at the same time as the temperature in $B_1$ increases and the pressure difference between the containers $B_1$ and $B_2$ decreases. Released heat energy ($Q_1$) can now be removed from the container $B_1$, and a state of equilibrium will be reached where the amount of water vapor per time unit supplied to the container $B_1$ releases a corresponding heat amount at the transitions between the different crystal water phases. The process continues until all $CaCl_2$ has been transformed to $CaCl_2.6H_2O$, and water continues to be taken up in excess until the solution reaches a steam pressure, which at the temperature in question equals the water vapor pressure in the container $B_2$.

The vapor pressure in the system should substantially be constituted by water vapor. If other gases were present, for example air, this would render the flow or the water vapor between the containers $B_2$ and $B_1$ more difficult. An increase in the partial pressure due to other gases would rapidly slow down the speed of the process.

The process at the extraction of energy can be compared with the energy extraction at a heat pump, but without any mechanical energy having to be supplied to the pump, because the container $B_1$ with its salt pumps heat energy from a lower temperature $t_2$ to a higher temperature $t_1$ and at the same time releases its own energy.

The regeneration or drying of $CaCl_2.6H_2O$ in the container $B_2$ takes place at energy storage. The process then runs in a direction opposite to that at energy extraction. Heat energy ($Q_1$) is supplied to the container $B_1$, which is given a temperature of, for example, $+100°$ C. while the container $B_2$ is held at a low temperature, for example $+5°$ C. to $+10°$ C. The water vapor pressure in $B_2$ then is about 10 torr. The solution of $CaCl_2 + 6H_2O$ found at the beginning of the drying in the container $B_1$ has a high vapor pressure and boils, whereby water is released and collected in $B_2$.

The drying of salt ($CaCl_2$), however, according to the method described above is difficult to carry out in a simple way in practice. The drying process proceeds very slowly at the equilibrium transition $$CaCl_2.2H_2O \rightarrow CaCl_2.H_2O + H_2O$$

The reason for this is that $CaCl_2.2H_2O$ forms needle-shaped crystals in liquid $CaCl_2.4H_2O$ whereby the gas passage successively becomes more difficult and finally is restricted to a few channels where complete drying of the salt to $CaCl_2$ occurs within limited areas.

A closed system permits the use of salts, which are unstable at their boiling point under atmospheric pressure, but can be dried at a lower temperature and pressure. $Na_2S$, for example, can suitably be used. $Na_2S.9H_2O$ has been dried with good result according to the low-pressure method at $+100°$ C. $Na_2S$ and its hydrates remain in crystalline form during the whole process.

The aforedescribed processes at energy extraction and energy storage have been tested in practice. The apparatuses used were in principle of the kind as described above. At energy extraction the released energy is measured calorimetrically in the container $B_1$. The container $B_1$ was immersed in a thermos vessel with water, and the increase in temperature of the water was measured. This measured energy was compared with the theoretically possible increase, on the basis of known $CaCl_2$ amount and the final mass of hydrate in the container $B_1$ at the end of the experiment.

It has been presumed above that the system has been designed as a closed system, which, however, is not absolutely necessary. At the drying process it may be practical when applying the method to successively remove the water amount (several m³) condensed during the process in the container $B_2$. At the extraction of energy it is then necessary to supply water from outside to the system. The water removal and supply in question is carried out so that foreign gases are not simultaneously introduced into the system or, if such introduction occurs, are removed rapidly by means of the vacuum pump P.

A heat accumulator with Na$_2$S theoretically yields a released heat energy of 6800 kJ/kg salt or, calculated per unit of volume, about as much as wood, if all phase transitions from zero to 9H$_2$O are utilized. Na$_2$S+4,5 H$_2$O→Na$_2$S.4,5 H$_2$O provides about half of this quantity of freed energy.

Na$_2$Se, LiCl, AlCl$_3$, Na$_2$SO$_4$, NaOH and KOH are theoretical examples of other salts which may be utilized according to the invention. In practice, however, Na$_2$S is superior in technical systems.

A further advantage of the low-pressure method is that the system automatically is switched from energy accumulation (charging) to energy extraction, because the direction of the process depends on the temperature $t_1$ and $t_2$. As an example, the point of equilibrium for CaCl$_2$.H$_2$O⇌CaCl$_2$+H$_2$O at the take-up and release, respectively, of energy lies at $t_1=+65°$ C. when $t_2=+5°$ C. (see FIG. 5). The function of the system is as follows. When $t_1$ is higher than $+65°$ C., energy is taken up thereby so that water is transferred to the container B$_2$. When the container B$_1$ is cooled, i.e. $t_1$ is lower than $+65°$ C. (and heat energy is utilized), water is transferred from B$_2$ to B$_1$.

Consequently, heat energy is stored automatically whenever it is available (and $t_1$ is higher than $+65°$ C. when CaCl$_2$ is concerned) and extraction of energy from the container B$_1$ can take place when so is desired. The direction of the process is controlled, without requiring control means known per se, automatically about $+65°$ C. when $t_2$ is assumed to be constant and, in the example, is $+5°$ C. The method just described can be applied to house heating and hot water production. In the following an example of such an installation is described with reference to FIG. 3.

Figure 3:
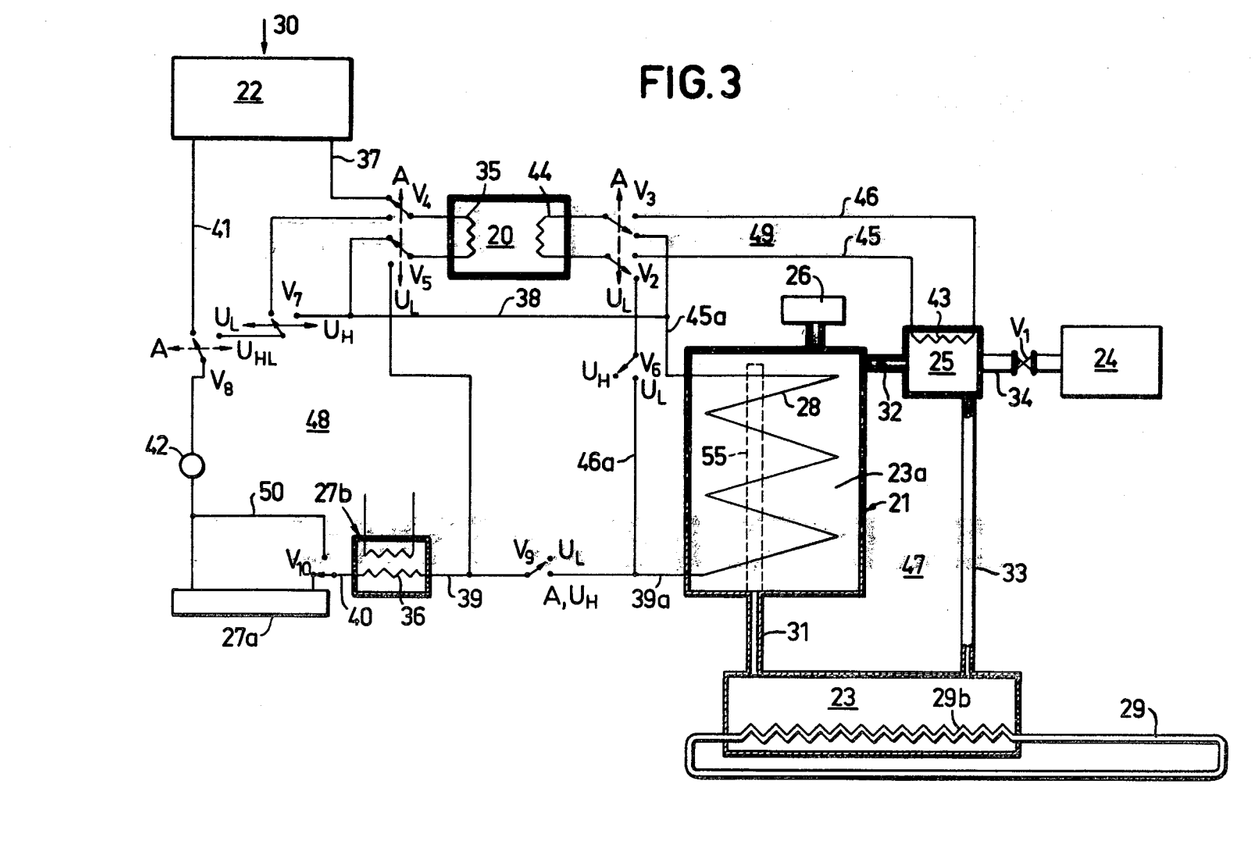
FIG. 3 is a block diagram of a system for house and water heating according to the low-pressure method.

This installation comprises the main components as follows:

Accumulator 21 with salt 23a (preferably Na$_2$S) and piping 28 with liquid medium to supply or remove heat energy (Q$_1$) at charging and discharging, respectively. The accumulator corresponds to the container B$_1$ in FIG. 1. The supply of energy to the accumulator 21 takes place according to FIG. 3 via a "solar collector" 22, but it may also take place, for example, through electric heating elements in the accumulator 21.

Solar collector 22 for converting solar and sky radiation 30 to heat energy to be supplied to the accumulator 21 at charging. The transport medium is a liquid, but preferably not water, if the liquid is passed through the piping 28 of the accumulator 21. (A water leakage in the accumulator would result in rapid energy development and pressure increase in the accumulator when a salt rich in energy is used). The component 22 may also designate e.g. a heat exchange in a flue gas duct or the like.

Water tank 23 corresponding (at least in part) to the container B$_2$ in FIG. 1. The water tank is provided with a system for supplying the heat energy (Q$_1$), which is required for the water evaporation at the discharge of the accumulator 21. The water tank 23 can be more or less deeply immersed into a lake or be dug down into the ground to a depth not exposed to frost and be connected to a heat exchanger 29b to take up heat energy from air, ground or sea water. In this example heat energy is assumed be taken from the ground in an earth winding 29.

Vacuum pump 24 for a pressure limit of about 0.5 torr. The pump is connected to the accumulator 21 via a conduit 34 with a valve V$_1$ and a condenser 25.

Condenser 25 utilizes the heat energy bound to the water vapor, which is removed from the salt of the accumulator, when it is being charged (if the heat pump mentioned below is utilized).

Pressure-sensing member or manometer 26, which electronically starts the vacuum pump 24 and opens the valve V$_1$ if the partial pressure of gases other than water vapor in the accumulator 21 exceeds a predetermined value (some torrs).

Radiators 27a for house heating, and heat exchangers 27b for hot-water production utilize the heat energy Q$_1$, which is taken out from the accumulator 21.

The above units or their equivalents are also shown in FIG. 1. In order to substantially increase the degree of utilization of the installation, preferably also a heat pump 20 is provided, which operates at the charging of the accumulator and at the extraction of heat energy from the accumulator.

In the schematic illustration in FIG. 3 also conduits for water vapor 31, 32 are shown, by which the accumulator 21 is connected to the water tank 23 and condenser 25, respectively, and a conduit 33 for condensed water vapor, in which conduit the condensate from the condenser is returned to the water tank 23, so that a closed circuit 47 is formed. Conduit 31 terminates in a perforated tube 55 by means of which the vapor can be distributed in the accumulator substance.

A second circuit 48 is formed by the solar collector 22, a winding 35 in the heat pump 20, the winding 28 in the accumulator 21, the radiators 27a and the conduits 37–41 connecting the said components, of which conduits the lastmentioned one includes a circulation pump 42 in a conventional manner. 50 designates a conventional shunt conduit past the radiators 27a, and V$_4$ ... V$_{10}$ are valves.

The installation according to FIG. 3 comprises a further circuit 49, in which the condenser 25 and the heat pump 20 are included. This circuit comprises windings or the like 43 and 44, respectively, located in the condenser and heat pump, which coils are interconnected through conduits 45, 46 for a preferably evaporating medium, by means of which heat is pumped from the condenser 25 to the medium flowing through the accumulator coil 28 in the heat pump 20 at the charging of the accumulator 21. The circuit 49 operates when the valves V$_2$ and V$_3$ are in the position A.

When the valves V$_2$, V$_3$, V$_6$ are in the position U$_L$, the accumulator coil 28 is connected to the coil 44 of the heat pump 20 via supply conduits 45a and discharge conduits 39a and the branch conduit 46a.

Three type of circulation pattern are visualized:

Accumulation, marked by A in the positions of the valves.

Discharging at low temperature of the salt, marked by U$_L$ in the positions of the valves.

Discharging at high temperature of the salt, marked by U$_H$ in the positions of the valves.

The valve positions of V$_8$ are marked with A (accumulation) and U$_{HL}$ (discharge of both high and low temperature).

At the charging of the accumulator 21 heat energy is pumped from the condenser 25 (where heat energy is released at the condensation of the water vapor flowing out from the accumulator) to the circulation system of solar collector 22 and accumulator 21 via the circuit 43-45-44-46-43, in which the heat pump 20 is comprised. All valves are in the position A (accumulation).

At the discharging of the accumulator at low temperature—when a higher temperature is required for radiators 27a and water-heater 27b than the temperature obtained in the medium flowing out from the accumulator—the heat pump 20 is connected between the accumulator and the heat consuming units, radiators 27a and water-heater 27b, via synchronously operated valves $V_4$ and $V_5$, which are operated synchronously also with the valves $V_2$ and $V_3$. All valves are in the position $U_L$ (discharge at low temperature).

The temperatures in different parts of the system are determined partly by the substance (for example salt or salt mixture) used in the accumulator and partly by technical-economic considerations, which include the size and design of the solar collector and the heat-absorbing capacity and the energy take-up system of the water tank and its energy take-up system and of the accumulator.

At the discharging of the accumulator at high temperature—when a sufficiently high temperature of the substance in the accumulator is obtained—the valves $V_6$ and $V_9$ are set in the position $U_H$ (discharge at high temperature).

Figure 4:
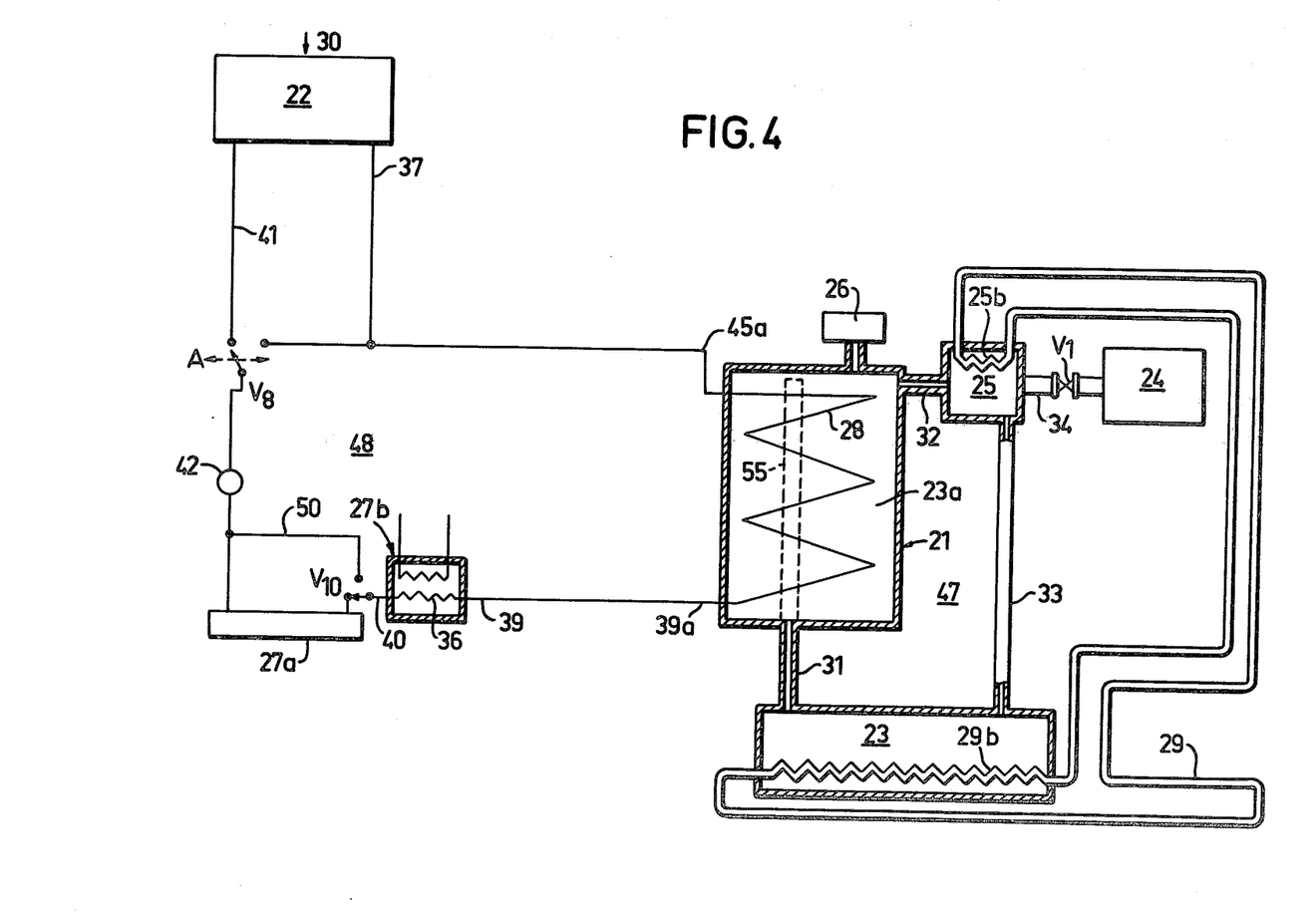
FIG. 4 illustrates a simplified modification of the device according to FIG. 3.

FIG. 4 illustrates a simplification of the system according to FIG. 3 without the optional heat pump 20 and requires no closer description.

The system according to FIG. 4 operates in the following way:

At charging (regeneration) of the substance in the accumulator 21 hot liquid from the solar collector 22 is circulated through a circuit comprising conduits 37 and 45a, tubing 28, conduit 39a+39, heat utilization units 27b and 27 (which may be interconnected in as well as disconnected from the circuit, thermically), pump 42 and conduit 41. Vapor which is freed in the accumulator 21 due to the heating is led through the conduits 32 and 31 to the containers 25 and 23 and is condensed therein under the influence of the cooling windings 25b and 29b. Liquid from the container 25 flows down into the container 23.

At discharge hot liquid from the accumulator 21 is conducted to the utilization units 27b and 27a through a circuit comprising the tubing 28, the conduit 39a+39, the pump 42 and a conduit 45a. In this process the accumulator 21 "pumps" heat energy from the container 23 in that water is vaporized therein and supplied to the accumulator 21 through the conduits 31 and 33+32. Heat energy for vaporization of the water is supplied to the water through tubing 29b from a ground winding 29.

Figure 5:
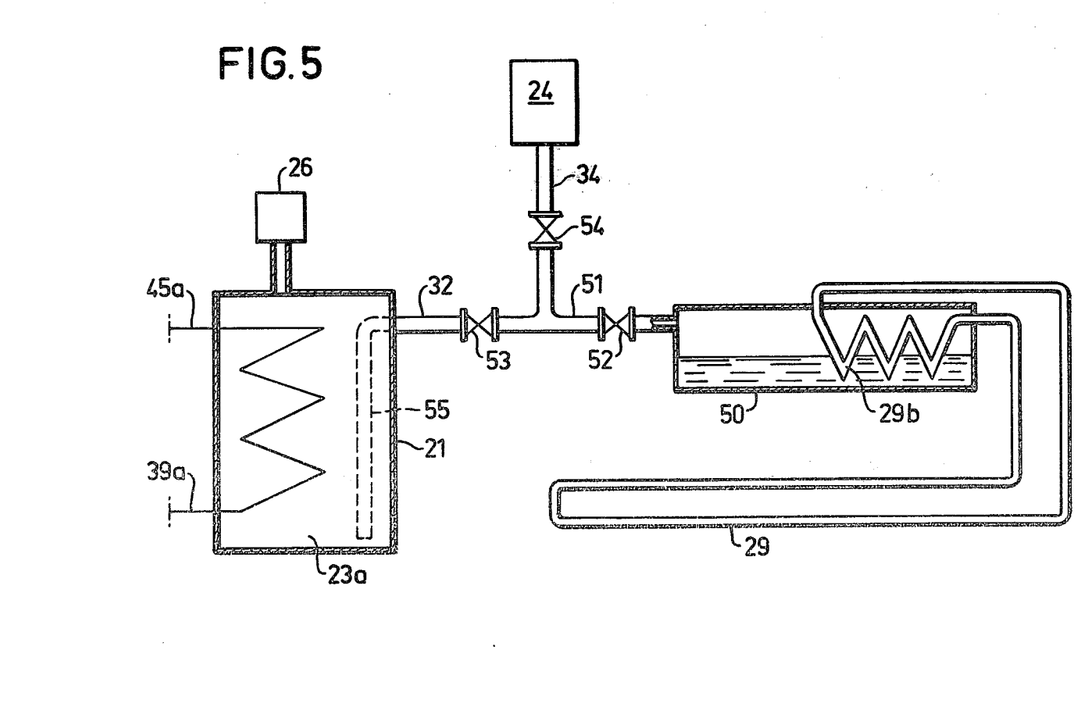
FIG. 5 illustrates a modified embodiment of the device according to FIG. 4 which has been modified partly on the basis of FIG. 1.

In FIG. 5 which illustrates a modification of the right-hand portion of the system according to FIG. 4 there have been made substantially two changes with respect to FIG. 4. The first one consists therein, that the vacuum pump 24 has been connected to a portion 51 of the conduit 32 between the energy accumulator 21 and the condenser container 25. The valves 54, 53 and 52 in FIG. 5 correspond to the valve $V_1$ in FIGS. 1, 3 and 4 and the valves $V_3$ and $V_2$ in FIG. 1, respectively. The second change mainly resides therein that the tank 23+the conduit 33+the condenser container 25 have been combined into one single container 50, which corresponds to the container $B_2$ of FIG. 1 and constitutes a water containing condenser and vapor generating means. In addition hereto there is shown a perforated tube 55 extending into the accumulator 21.

The system according to FIG. 5 functions in principle in the same way as that according to FIG. 4 apart from the fact that it is possible in the system according to FIG. 5 selectively to evacuate either the container 50 or the accumulator 21 or both at the same time, by means of the vacuum pump.

The circuits for the supply of hot liquid from the solar collector to the accumulator at charging and from the accumulator to the consumption units at discharging are the same as those which have been described above with reference to FIG. 4.

At charging freed vapor from the accumulator 21 is conducted through the tube 55, the conduit 32, the valve 53, the conduit 51 and the valve 52 to the container 50 which functions as a condenser during the charging process. Freed heat energy is conducted away through the piping 29b to the ground winding 29.

At discharging water in the container 50 is vaporized and conducted through the valve 52, the conduit 51, the valve 53, the conduit 32 and the tube 55 to the accumulator 21. Heat energy for the vaporization is taken from the ground winding 29 through the tubing 29b. The vacuum pump 24 as well as the valves 54, 52 and 53 are governed by the pressure sensitive device 26.

Figure 6:
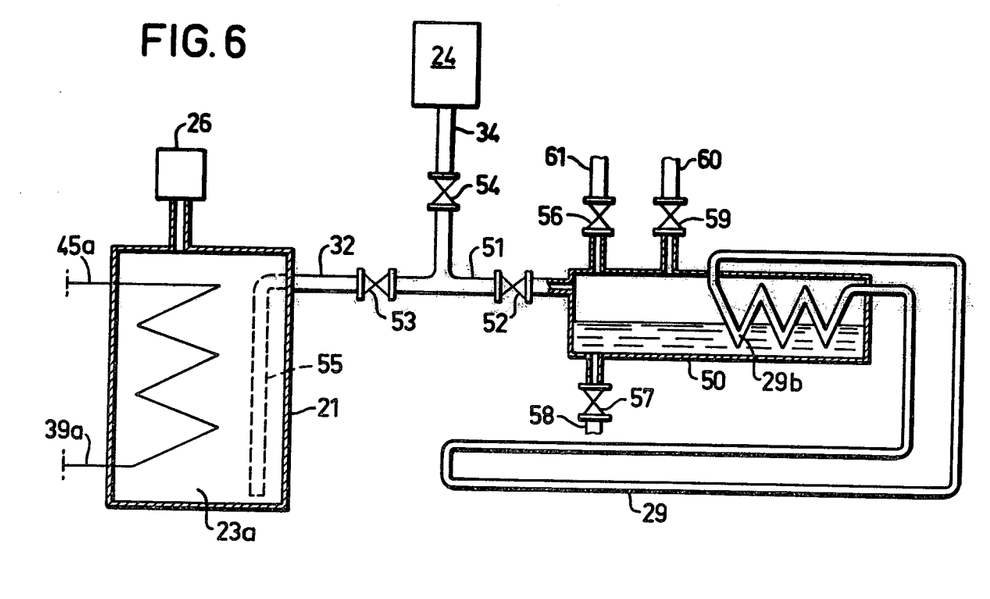
FIG. 6 illustrates a modification of the device according to FIG. 5.

The system according to FIG. 6 is entirely consistent with that illustrated in FIG. 5 with the exception that the water container 50 has been provided with inlet and outlet conduits 61 and 58 respectively for water, which are each provided with a shut off valve 56 and 57 respectively, as well as with an air supply conduit 60 which is provided with a shut off valve 59 and serves the purpose of facilitating or making possible drainage of water from the container 50.

The system according to FIG. 6 functions in the following way, the processes at the charging and discharging of the accumulator 21 being the same as those of FIGS. 4 and 5. The processes at the transfer of vapor between the accumulator 21 and the container 50 are basically the same as those according to FIG. 5, with the difference, however, that when, at discharge, the water level in the container 50 has sunk to a minimum value, a level sensor (not shown) actuates valves and pumps in the following way: First, valve 52 is closed, after which valve 56 is opened and water is supplied to the container 50 from the water pipe 61. When the maximum level is attained, valves 56 and 53 close. After that pump 24 starts and valves 54 and 52 open, after which extraneous gases (air) are evacuated by means of the pump 24. After a suitable pumping time valve 54 is closed, pump 24 is stopped and valve 53 is opened. Valve 57 is maintained closed during the discharge process.

At charging the level sensor is activated when the water level in the container 50 has risen to a predetermined maximum value. Then valve 52 is shut and the valves 57 and 59 are opened. Water is evacuated to a sink through valve 57 and the conduit 58 simultaneously as air of atmospheric pressure is supplied to the container 50 through valve 59 and conduit 60. When the container 50 has been drained, valves 57, 59 and 53 are closed. After that pump 24 is started and valves 54 and 52 are opened, air in the container 50 then being evacuated during a suitable pumping time. After that valve 54 is closed, pump 24 is stopped and valve 53 is opened.

When dimensioning the installation according to FIG. 3-6 for house heating with the method according to the invention by utilizing solar energy and available low-temperature heat energy in the ground, the air etc., the following conditions are to be observed.

The annual consumption of a residence with about 150 m² dwelling space can vary between about 30,000 and 10,000 kWh (1.1.10⁵MJ—0.36.10⁵MJ), depending on heat insulation and annual mean temperature at the place where the villa is located. (The annual consumption of a normal one-family villa, insulated according to the Swedish Building Code of 1975, is about 20,000 kWh).

According to investigations (see Teknisk Tidskrift 1975:14, page 17), the storage demand when using solar energy is in the southern part of Sweden about 50% and in the northern part of Sweden over 60% of the annual energy demand. The storage demand for an existing normal one-family villa can be expected to be about 12,000 kWh or $0.4-10^5$MJ=10.3.10⁶kkal.

According to available data, this purely thermal energy storage requires under the above prerequisite conditions the following amounts of different substances:
776 tons of stone heated from 20° C. to 100° C.
332 tons of iron heated from 20° C. to 100° C.
108 tons of water heated from 20° C. to 100° C.
224 tons of salt hydrate mixture (melts at 13° C.)
22 tons of litium hydride (melts at 675° C.)

The take-up of water of crystallisation ($H_2O$ being presupposed to be in the state of vapor) requires
12 tons $CaCl_2$, (specific weight: 1) corresponding to
9.2 tons of $MgCl_2$ (specific weight: 0.5) corresponding to about 18 m³, or
about 6 tons of $Na_2S$ if all phase transitions ($0 \rightarrow 9H_2O$) are utilized, or
about 12 tons of $Na_2S$ if only the phase transition $0 \rightarrow 4.5\ H_2O$ is utilized.

As is apparent from the above values, the method according to the invention is superior to other thermal storage methods for two reasons:
1. The substantially smaller amount of mass in the storage of a given energy amount than at the use of other substances (9 times less than at the use of water)
2. Requires (like the salt hydrate mixture) no space-requiring and expensive heat insulation in long-term storage.

Calcium chloride, magnesium chloride and sodium suphide, moreover, are cheap substances.

The surface of the solar collector 22 can also be estimated on the basis of the aforementioned article in Teknisk Tidskrift, from which it appears that a horizontal surface of 100 m² yields 56 MWh/year at 40° C. and 39 MWh/year at +80° C. temperature of the transporting liquid flowing through the circulation system. (The values refer to the Stockholm district). The annual consumption in the assumed normal residence is according to the above 20,000 kWh. This does not imply that all of this heat energy must be supplied to the solar collector. By utilizing water vapor formed by low-temperature heat energy in the ground, the air etc. theoretically only 1/3.7 of said energy amount, viz. 5,400 kWh/year, is required in a system according to FIG. 3. The surface of the solar collector, therefore, should (theoretically) be about 14 m² for delivering liquid with the temperature+80° C. A surface of about 20 m², therefore, is sufficient with ample margin when using the present method.

According to a further development of the invention it is possible, by connecting several accumulators, each having an individual, low-temperature (with respect to its accumulator) vapor generating and condensing device with appurtenant water container, in series and passing warmer and warmer water vapor from one step to the next to obtain temperatures higher than that of the heat source which was used to charge the accumulators, e.g.+150° C. to+200° C. This is disclosed in FIGS. 7 and 8 which diagrammatically illustrate three heat energy accumulators coupled in series, at the extraction of heat energy from and the storage of heat energy into them, respectively.

Figure 7:
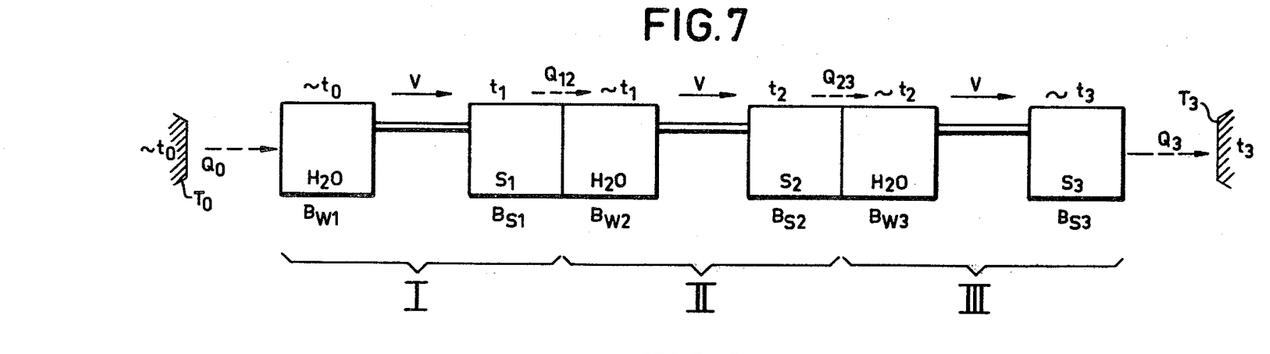
FIGS. 7 and 8 disclose three heat energy accumulators coupled in series, and the extraction of heat energy from and the storage of heat energy into them, respectively.
Figure 8:
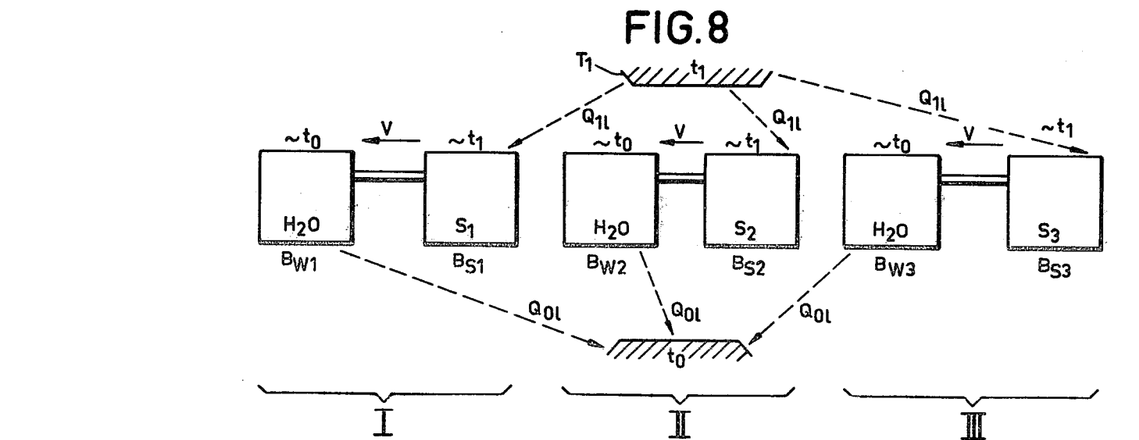

The accumulators are designated $B_{S1}$, $B_{S2}$ and $B_{S3}$, respectively. Each accumulator is comprised of a substance container with a storage substance $S_1$, $S_2$ and $S_3$, respectively. The accumulators are connected to vapor condensing and generating means having a liquid container $B_{W1}$, $B_{W2}$ and $B_{W3}$, respectively. The systems comprising $B_{W1}+B_{S1}$, $B_{W2}+B_{S2}$ and $B_{W3}+B_{S3}$ are designated I, II and III, respectively. $T_0$, $T_1$ and $T_3$ represent heat sources or heat sinks having the temperatures $t_0$, $t_1$ and $t_3$ which are each presumed to be substantially constant. Temperature $t_1$ is presumed to be higher than $t_0$ and lower than $t_2$ which is in its turn lower than $t_3$. Solid arrows V represent vapor flow and brooken arrows Q represent heat flow.

At discharge, the containers $B_{S1}$ and $B_{S2}$ are thermally connected to $B_{W2}$ and $B_{W3}$, respectively, preferably through heat exchangers.

Heat energy $Q_0$ is transferred from the heat source $T_0$ to the liquid container $B_{W1}$ of accumulator I, where liquid is vaporized. The vapor flows to substance container $B_{S1}$ on account of the pressure difference between $B_{W1}$ and $B_{S1}$.

When the vapor from the liquid container $B_{W1}$ is absorbed by the substance $S_1$ in container $B_{S1}$, heat energy $Q_{12}$ at the temperature level $t_1$ is freed, which is transferred to the liquid container $B_{W2}$ in which liquid is vaporized. Vapor flows to container $B_{S2}$ due to the pressure difference between $B_{W2}$ and $B_{S2}$.

When vapor from container $B_{W2}$ is absorbed by the substance $S_2$, heat energy $Q_{23}$ at the temperature level $t_2$ is freed. This energy is transmitted to water container $B_{W3}$ in which liquid is vaporized. Vapor flows to substance container $B_{S3}$ due to the pressure difference between $B_{W3}$ and $B_{S3}$.

When vapor from the container $B_{W3}$ is absorbed by the substance in the container $B_{S3}$ heat energy at the temperature level approximately $t_3$ is freed and transferred to the heat sink $T_3$, i.e. a heat consumer at the temperature level $t_3$.

At the storage of heat energy the thermal connections $Q_{12}$ and $Q_{23}$, $B_{S1}-B_{W2}$ and $B_{S2}-B_{W3}$ are interrupted.

The accumulators $B_{S1}$, $B_{S2}$ and $B_{S3}$ are charged in parallel with heat energy $Q_{11}$ from the heat source $T_1$ at the temperature level $t_1$. Vapor formed at the charging or storage process condenses in the liquid containers $B_{W1}$, $B_{W2}$ and $B_{W3}$ connected to the respective accumulators $B_{S1}$, $B_{S2}$ and $B_{S3}$, heat energy being drained off to a heat sink at the temperature level $t_0$. Part of the energy quantity $Q_{11}$ is stored as dehydration energy in the accumulators.

As a preparation to extraction of energy $t_0$ is raised to $t_1$ in $B_{W2}$ and to $t_2$ in $B_{W3}$.

The high-temperature heat energy at $t_3$, e.g. 200° C., can be used for heating a suitable gas, which in a Carnot-cyclus converts heat energy to mechanical energy, which in its turn easily can generate electric energy. As by the afore-described method every square meter of solar collector can release 390.3,7 kWh/year, or a mean effect through the year of 170 W, a solar collector with 20 m² surface yields the mean effect 3,4 kW. Only part thereof can be converted to electric effect. A heat loss, for example, is caused thereby that the salt is to be heated in each accumulator stage or step, which implies a loss of mechanically applicable heat energy of about 10% per step. Three steps reduce the effect to about 2,4 kW. In the Carnot-cyclus at maximum 20%, i.e. 0.48 kW, is converted to mechanical energy, and the electric generator finally delivers about 0.4 kW continuously. At normal electricity consumption much greater amounts, of the magnitude of several kW, are taken out, without restrictions being imposed by the accumulator system. The heat energy, which was taken out from the accumulator and was not converted to electric energy, is not lost, because it can be used for heating purposes.

The possibility is not excluded that in the future a direct thermo-electric energy conversion can be utilized.

The electric energy consumption in the aforesaid residence can be assumed to be between 7,000 and 10,000 kWh/year. A solar collector surface of about 50 m² then is sufficient for providing the residence completely with electric energy as well as heat energy.

An installation for combined electric energy and heat energy production according to the invention in a residence has three apparent advantages over other methods:

No direct expenditures for fuel (oil, coal) or electric energy.

The residence does not need to be connected to an electric distribution system.

The installation throughout is protective to environment, i.e. no combustion products are produced, and the installation constitutes a natural link in the ecological system even from a heat energy aspect.

The embodiments described above and shown in the drawings, are of course, to be regarded only as non-limiting examples and can be modified as to their details within the scope of the annexed claims. Thus, although the above embodiments mainly have been described in connection with water and water vapor, the invention also covers other liquids and vapors than water and steam, respectively. Furthermore, a heat exchanger, for example, which is located in a flue or gas duct or in a boiler, may be used instead of or as a supplement to the solar collector. The systems connected in series may also comprise more or fewer stages than the three disclosed ones, e.g. two, four or five stages. In addition hereto new embodiments, which also are within the scope of the said claims, can be brought about by combining in a suitable way details from variety ones of the above embodiments.

What we claim is:

1. Method of storing heat energy in a substance which is comprised in a chargeable and dischargeable energy accumulator and contains less liquid in the charged, high-energy condition of the accumulator than it does in the discharged, low-energy condition of the accumulator, comprising the steps of driving off vapor from the accumulator substance and transferring said vapor to vapor condensing and generating means while maintaining said vapor condensing and generating means at a low temperature as compared with the accumulator, and maintaining the system comprising said energy accumulator and said low temperature means substantially free from other gases than said vapor, so that the pressure in said system is constituted substantially by the pressure of said vapor.

2. Method of extracting heat energy from a substance which is comprised in a chargeable and dischargeable energy accumulator and contains less liquid in the charged, high-energy condition of the accumulator than it does in the discharged, low-energy condition of the accumulator, comprising the steps of introducing vapor from a vapor source, which has a low temperature as compared with the accumulator, into the accumulator substance, maintaining the system comprising said energy accumulator and said low temperature vapor source substantially free from other gases than said vapor, so that the pressure in said system is constituted substantially by the pressure of said vapor, and transferring heat energy to energy utilization means.

3. Method according to claim 1, wherein said vapor is water vapor.

4. Method according to claim 2, wherein said vapor is water vapor.

5. In a method of storing heat energy into and extracting heat energy from an energy accumulator substance the steps of: driving off vapor from said substance and transferring said vapor to vapor condensing and generating means when storing energy in the accumulator; maintaining said vapor condensing and generating means at a low temperature as compared with that of the accumulator; leading vapor from said vapor condensing and generating means to said substance when extracting energy from the accumulator; and maintaining the system comprising the accumulator and said vapor condensing and generating means substantially free from other gases than said vapor, so that the pressure in said system is constituted substantially by the pressure of said vapor.

6. Method of extracting energy according to claim 5, comprising the steps of maintaining first vapor condensing and generating means, comprising a first liquid container and associated with a first energy accumulator, at a lower temperature than said energy accumulator, and pumping heat energy from said first liquid container to a second liquid container comprised in second vapor condensing and generating means and associated with a second energy accumulator connected in series with said first energy accumulator, while maintaining said second liquid container at a higher temperature than said first liquid container and maintaining said second vapor condensing and generating means at a lower temperature than said second energy accumulator.

7. Method according to claim 6, comprising the steps of pumping heat energy from said second liquid container to a third container comprised in third vapor condensing and generating means and associated with a third energy accumulator connected in series with said second energy accumulator; while maintaining said third liquid container at a higher temperature than said second liquid container and maintaining said third vapor condensing and generating means at a lower temperature than said third energy accumulator.

8. System for the storage of heat energy into and the extraction of heat energy from at least one energy accumulator comprising a substance, which contains a bound liquid in the low-energy or discharged condition of the accumulator and which substantially lacks bound liquid in the high-energy or charged condition of the accumulator; means for the charging of the accumulator by vaporation of liquid from the substance of the accumulator due to supply of heat from an energy source to the accumulator substance; a vapor generating and condensing means, which has a low temperature in relation to the energy accumulator and has a liquid container for collecting condensed vapor from the accumulator substance and means for the supply of vapor from the liquid container to the accumulator substance for discharging the accumulator; pressure reducing means for maintaining the partial pressure of other gases than said vapor at a lower level than the partial pressure of said vapor in the system comprising the energy accumulator and said low temperature means; and means for utilizing the energy freed at the discharge of the accumulator.

9. System according to claim 8, wherein said liquid is water and said vapor is steam.

10. System according to claim 9, comprising means for maintaining the temperature in the liquid container below about +10° C., at least during the discharge of the accumulator.

11. System according to claim 9, wherein at least the principal portion of the accumulator substance consists of crystals containing water of crystallization in the low-energy or discharged condition of the accumulator and being substantially free of water of crystallization in the high-energy or charged condition of the accumulator.

12. System according to claim 9, wherein the substance is substantially comprised of $Na_2S$.

13. System according to claim 8, wherein the accumulator and the container for the moistening of the accumulator substance are comprised in a substantially closed system, preferably constituting a first closed circuit.

14. System according to claim 8, wherein said liquid container has a liquid inlet and a liquid outlet.

15. System according to claim 8, wherein said pressure reducing means comprise a vacuum pump which is connectable to at least one of the components of the group consisting of said condenser means, said liquid container and said accumulator by means of conduits provided with a shut off valve.

16. System according to claim 8, wherein said means for the supply of heat to the accumulator substance comprises a solar collector which is connected to the accumulator and is comprised in a second circuit for a heat transfer fluid, said second circuit comprising a heat transfer winding, which is embedded in the accumulator substance.

17. System according to claim 8, wherein said means for the supply of heat to the accumulator substance comprises a heat exchanger which is located in a flue and is comprised in a second circuit for a heat transfer fluid, said second circuit comprising a heat transfer winding which is embedded in the accumulator substance.

18. System according to claim 8, wherein said means for utilizing the freed energy are comprised in a third circuit for a heat transfer fluid, said third circuit comprising a heat transfer winding passing through the accumulator substance.

19. System according to claim 8, comprising means for storing heat energy in the accumulator through ohmic heating of the accumulator substance.

20. System according to claim 8, in which a heat pump is interconnected between said energy accumulator and its energy source.

21. System according to claim 20, wherein said heat pump comprises a second energy accumulator which is basically of the same type as the first-mentioned one but contains an accumulator substance having a volatile component whose temperature of vaporization is substantially lower than that of the substance of the first-mentioned accumulator.

* * * * *